(No Model.)
N. W. CALHOUN & J. G. CHAMBERS.
LEATHER PUNCHING MACHINE.
No. 313,172. Patented Mar. 3, 1885.
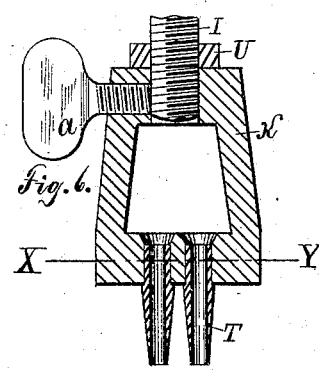
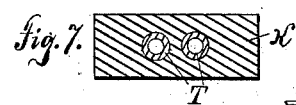
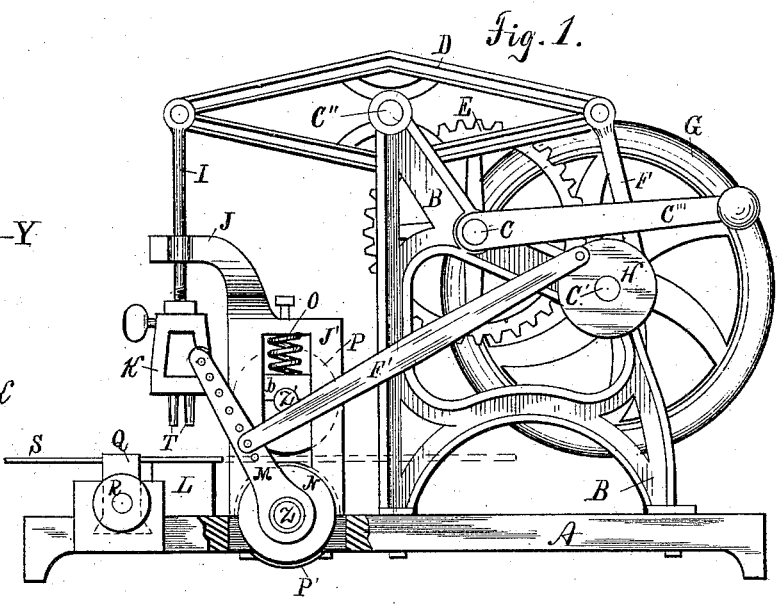
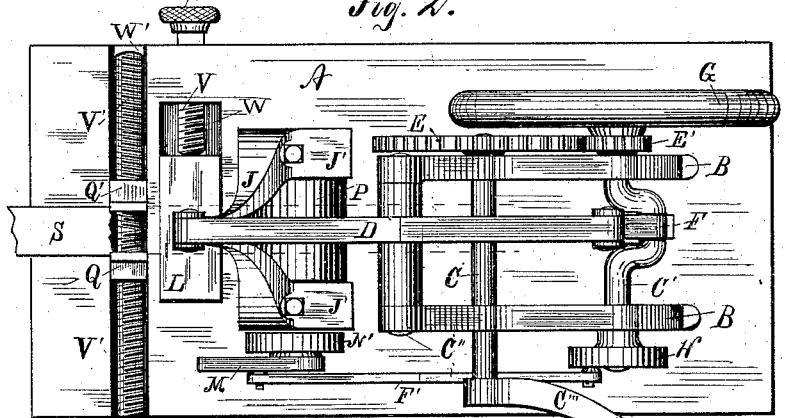
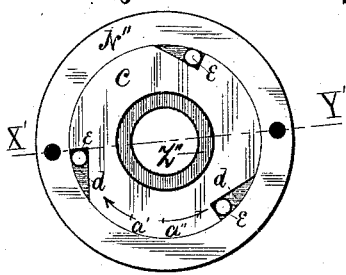
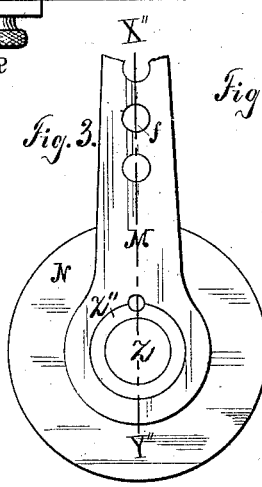
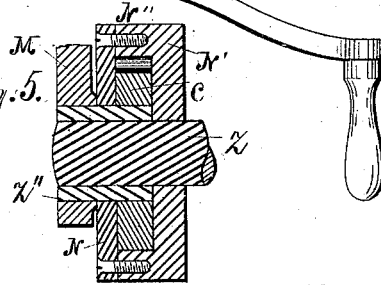
WITNESSES:
Wallace Greene
W. B. H. Slocker
INVENTOR
Noah W. Calhoun
John G. Chambers
by Robt. H. Wiles
ATTORNEY

UNITED STATES PATENT OFFICE.

NOAH W. CALHOUN AND JOHN G. CHAMBERS, OF LENA, ILLINOIS; SAID CALHOUN ASSIGNOR TO SAID CHAMBERS.

LEATHER-PUNCHING MACHINE.

SPECIFICATION forming part of Letters Patent No. 313,172, dated March 3, 1885.

Application filed May 12, 1884. (No model.)

*To all whom it may concern:*

Be it known that we, NOAH W. CALHOUN and JOHN G. CHAMBERS, residents of Lena, in the county of Stephenson and State of Illinois, have invented certain new and useful Improvements in Leather-Punching Machines; and we do hereby declare the following to be a full, clear, and exact description of the invention, such as will enable others skilled in the art to which it pertains to make and use the same.

Our invention relates to improvements in leather-punching machines, and especially to that class of machines used for punching eyelet-holes in straps for fly-nets or other harness-makers' work. It is fully explained and described in the following specification, and shown in the accompanying drawings, in which—

Figure 1 is a side elevation of the machine, a portion of the bed being broken away to show the ratchet device which actuates the feed-rolls; Fig. 2, a plan of the machine, the punching-head K being removed to show parts beneath; Fig. 3, an enlarged elevation of the pawl-and-ratchet mechanism; Fig. 4, an elevation of the same, the lever M, plate N, and shaft L being removed to show the remaining parts; Fig. 5, a central transverse section of the same, the plane of section passing through the line $x'$ $y'$, Fig. 4, and line $x''$ $y''$, Fig. 3; Fig. 6, a central vertical section of the punching-head K; and Fig. 7, a horizontal section thereof through the line $x$ $y$, Fig. 6.

In these views, A is the bed of the machine; B, a suitably-braced frame bolted to the bed, and C the main shaft of the machine, journaled in the frame B, and provided at one end with a crank, C''', and at the other end with a rigidly-mounted spur-gear, E, said crank and gear serving to apply power to said shaft and to transmit it therefrom, respectively. The gear E engages with a small pinion, E', Fig. 2, rigidly mounted on a shaft, C', which is journaled in the frame B, and is bent near its center to form a crank. A walking-beam lever, D, is pivoted at the center on a shaft, C'', journaled in the frame B at its highest point, one end of the lever being directly above the cranked shaft C', and a pitman, F, connects the crank of the shaft C' with the end of the walking-beam, and converts the rotation of said crank into vertical reciprocation of the walking-beam. The end of the walking-beam opposite the pitman F supports and imparts motion to a vertically-reciprocating shaft, I, sliding in a stationary guide, J, which is formed integrally with and supported by two slotted posts, J', bolted to the bed of the machine. The lower part of the shaft I is screw-threaded and provided with a nut, U, Figs. 1, 6, placed at a suitable distance above the end of the shaft, and below the nut is fastened on the shaft by means of a set-screw, $a$, the open punch-carrying head K.

In the lower face of the head K are set two downwardly-projecting hollow punches, T, of ordinary form, sharp at the lower edges, and opening above into the open space in the head. A block, L, preferably of wood, rests in a socket, W, in the upper face of the bed A, and is held in place by a set-screw, V, provided with a suitable head, R'. This block lies immediately under the punches T, and is of such height that the ends of the punches strike it when at their lowest point.

Between the block L and the frame B are placed two coacting feed-rolls, P P', Fig. 1, whose line of contact is in the horizontal plane of the top of the block. The lower roll, P', is mounted on a shaft, Z, journaled in stationary bearings, while the upper roll, P, is mounted on a shaft, Z', journaled in bearings $b$, Fig. 1, sliding vertically in the slotted posts J', and pressed downward by springs O.

Intermittent rotation is imparted to the feed-roll P' by a mechanism hereinafter described, and the motion of the roll P' is communicated to its companion P by the friction of the two rolls. A strap placed between the feed-rolls (as S, Figs. 1, 2) is moved intermittently in the direction indicated by the arrow $a$, Fig. 1, the motion of the rolls being such as to feed the strap forward during half of each revolution of the shaft C', and leave it at rest during the remainder of the revolution. While the strap is at rest the punches T are pressed down and perforate it, and before the punches descend again the strap is drawn forward a distance equal to twice the space between the centers of the two punches, and again comes to rest. The punches, as shown, perforate the strap in a single line; but the head K may be turned ninety degrees, when the strap will be perforated with two rows of holes at a distance apart equal to the distance between the two punches T. The strap is secured against lateral motion by two guides, Q Q', sliding in a transverse dovetail groove, W', and moved symmetrically in and out from the center line of the bed by means of a right-and-left-hand screw, V', provided with a head, R, by means of which it is turned.

On the shaft Z of the feed-roll P' is mounted, outside the bearing J', a circular plate, N', provided on its outer face with an annular flange, N'', Figs. 4, 5, the plate and flange forming a cylindrical box rigidly fastened to the shaft.

Within the box N' N'' fits a circular plate, c, fastened rigidly to a sleeve, Z'', which turns freely on the shaft Z. A plate, N, with an opening at its center for the sleeve and shaft Z'' Z, is screwed to the flange N'', and holds the plate c in place, and a lever, M, is fastened to the sleeve Z'' outside the plate m and affords a means of turning the sleeve Z'' and the plate c, thereto attached. A pitman, F, connects the lever M with a crank-pin on the outer face of a crank-plate, H, mounted on the end of the shaft C', Figs. 1, 2. Thus at each rotation of the shaft C' the lever M is oscillated, with the shaft Z as an axis, and the plate c is rotated reciprocally through an angle equal to the angle of oscillation of the lever.

In the periphery of the plate c are cut a series of wedge-shaped pockets, d, and in each of the pockets is a ball or roller, e, of such diameter as to lie loosely in the deepest part of the pocket. When the plate c turns in the direction indicated by the arrow $a''$, Fig. 4, the rollers e lie in the deeper ends of the pockets d, and the plate turns freely in the box N' N''; but when the plate c turns in the direction indicated by the arrow $a'$, Fig. 4, the rollers e are forced into the shallower ends of the pockets d, and form a clutch between the plate c and flange n'', and the motion of the plate is communicated directly to the box N' N'' and to the roll P', which is rigidly mounted on the shaft Z of the box. The lever M is provided with a series of holes for changing the point of connection of the lever with the pitman F', and thus varying the angle of oscillation of the lever and the angle of rotation of the feed-rolls, and lengthening or shortening the space through which the strap S is fed at each rotation of the crank-plate H.

It will be observed that the position and direction of rotation of the feed-rolls is such that every point on the strap fed forward must pass under the punch before reaching the rolls. In other words, the strap is drawn through the punching mechanism by the rolls, instead of being pushed through—a fact which constitutes an important difference between this machine and machines for various purposes in which a pushing-feed is employed. In metal-working machines the pushing-feed is common, and the stiffness of the material operated on makes that form of feed practical; but the drawing-feed is greatly to be preferred in a leather-working machine of this class, as it avoids any tendency to the bending or "buckling" of the leather between the rolls and the punch.

Having now described our invention and explained its operation, what we claim as new, and desire to secure by Letters Patent, is—

1. The combination of the block L, reciprocating head K, punches T, set in said head, lateral guides Q Q', and regulating-screw V', feed-rolls P P', and means, substantially as shown and described, whereby intermittent rotation is imparted to said feed-rolls.

2. The combination of the feed-rolls P P', mounted on shafts Z' Z, respectively, the flanged plate N' N'', rigidly mounted on the shaft Z, the plate c, sleeve Z'', and lever M, rigidly connected and rotating freely on the shaft Z, the retaining-plate N, rollers e, lying in wedge-shaped pockets d, and means, substantially as shown and described, for imparting reciprocal motion to said lever M, substantially as and for the purpose set forth.

3. The combination of the cranked shaft C', pitman F, lever D, shaft I, head K, and punches T with the feed-rolls P P', lever M, pitman F', crank-plate H, and pawl-and-ratchet mechanism connecting said lever M and said feed-rolls, whereby the rotation of the shaft C' imparts vertical reciprocation to said punches and intermittent rotation to said feed-rolls, substantially as shown and described, and for the purpose set forth.

In testimony whereof we have signed this specification in the presence of two subscribing witnesses.

NOAH W. CALHOUN.
JOHN G. CHAMBERS.

Witnesses:
MICHAEL STOSKOPF,
WALLACE GREENE.